(12) United States Patent
Doyle

(10) Patent No.: US 10,408,058 B2
(45) Date of Patent: Sep. 10, 2019

(54) CONNECTING ROD AND PISTON FOR AN OIL-LESS PNEUMATIC MOTOR

(71) Applicant: Circle Dynamics Inc., Peterborough (CA)

(72) Inventor: James Laurence Doyle, Cavan (CA)

(73) Assignee: Circle Dynamics Inc., Peterborough (CA)

( * ) Notice: Subject to any disclaimer, the term of this patent is extended or adjusted under 35 U.S.C. 154(b) by 222 days.

(21) Appl. No.: 14/959,036

(22) Filed: Dec. 4, 2015

(65) Prior Publication Data

US 2016/0160645 A1    Jun. 9, 2016

Related U.S. Application Data

(60) Provisional application No. 62/087,855, filed on Dec. 5, 2014.

(51) Int. Cl.
*F01B 9/02* (2006.01)
*F16C 7/00* (2006.01)

(52) U.S. Cl.
CPC . *F01B 9/02* (2013.01); *F16C 7/00* (2013.01)

(58) Field of Classification Search
CPC ...... F01B 9/02; F16C 7/00; F16C 9/02; F16C 9/04; F16J 1/10; F16J 1/14; F16J 1/22; F04B 1/04; F04B 1/0408
See application file for complete search history.

(56) References Cited

U.S. PATENT DOCUMENTS

| | | | | |
|---|---|---|---|---|
| 1,361,235 A | * | 12/1920 | Duchesne | F16C 9/04 74/580 |
| 1,365,667 A | * | 1/1921 | Duchesne | F16H 21/34 403/122 |
| RE19,904 E | * | 3/1936 | Donaldson | F16J 1/22 403/131 |
| 2,107,795 A | * | 2/1938 | Larsh | F16J 1/22 403/39 |
| 3,695,150 A | * | 10/1972 | Salzmann | F01B 9/026 123/18 R |
| 4,543,000 A | * | 9/1985 | Hasenbalg | B41J 29/393 400/180 |
| 4,626,112 A | * | 12/1986 | Kramer | B63H 23/34 384/296 |
| 4,944,215 A | * | 7/1990 | Nimmo | F15B 15/1433 277/505 |

(Continued)

*Primary Examiner* — Thomas E Lazo
(74) *Attorney, Agent, or Firm* — Eric L. Lane; Green Patent Law

(57) ABSTRACT

A connecting rod and piston assembly for use in an oil-less pneumatic motor, wherein said connecting rod and piston do not require a wrist pin for connecting said rod to said piston; said connecting rod having at least two ends, connected to each other by a connecting member of a predetermined length; said at least two ends being a piston end and a crankshaft end; said piston end being distant said crankshaft end; said piston having a cylinder end and a connecting rod piston end receiving end, wherein said connecting rod piston end receiving end matingly engages said connecting rod piston end; said piston end is substantially ball shaped and said crankshaft end is shaped for engagement with a crankshaft; said connecting rod piston end receiving end is a socket shape to matingly receive said ball shaped piston end.

17 Claims, 12 Drawing Sheets

(56) References Cited

U.S. PATENT DOCUMENTS

| | | | | |
|---|---|---|---|---|
| 5,119,770 | A * | 6/1992 | Graham | F02B 75/22 123/197.4 |
| 5,560,332 | A * | 10/1996 | Chang | F02B 75/32 123/197.3 |
| 5,638,738 | A * | 6/1997 | Sell | F01B 1/08 74/44 |
| 5,794,512 | A * | 8/1998 | Prosch | B60K 23/02 403/122 |
| 6,941,837 | B2 * | 9/2005 | Rummel | F16C 7/023 123/43 R |
| 7,451,737 | B2 * | 11/2008 | Songen | F02F 3/0023 123/197.3 |
| 8,574,201 | B2 * | 11/2013 | Chattaraj | A61M 5/31511 604/193 |
| 8,845,222 | B2 * | 9/2014 | Frank | F04B 53/22 401/150 |
| 2016/0038895 | A1 * | 2/2016 | Shramo | B01F 15/00681 366/331 |

* cited by examiner

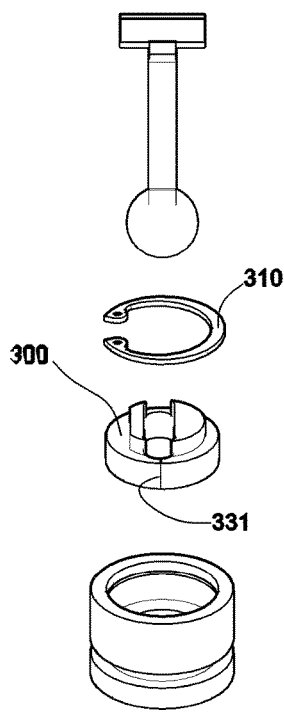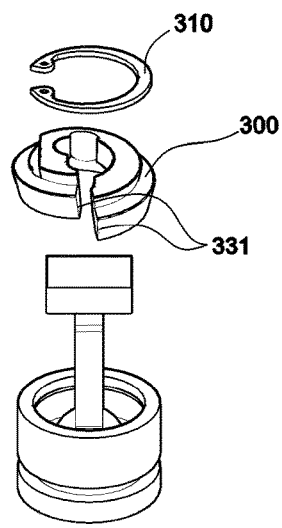
FIGURE 17A    FIGURE 17B
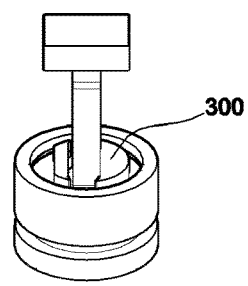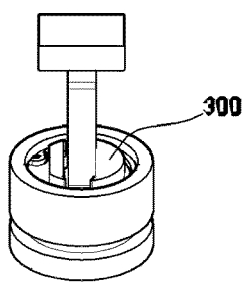
FIGURE 17C    FIGURE 17D

CONNECTING ROD AND PISTON FOR AN OIL-LESS PNEUMATIC MOTOR

CROSS-REFERENCE TO RELATED APPLICATION

This application is a non-provisional of and claims priority to U.S. Patent Application No. 62/087,855, filed Dec. 5, 2014, which is hereby incorporated by reference in its entirety.

FIELD OF THE DISCLOSURE

This relates to a pneumatic motor that does not require constant lubrication, particularly useful in areas and conditions that are sensitive to contamination by oil, and in particular a rod and piston assembly, for use in a pneumatic motor, that increases the life span of the rod and piston when used in the pneumatic motor.

BACKGROUND

Current pneumatic piston style motors typically use metal components that require the constant addition of lubrication, typically oil. When the motors and components are not maintained periodically, operators may overcompensate the addition of oil for lubrication, resulting in possible oil contamination of the work area. Regardless, oil style pneumatic motors requiring lubrication may not be suitable for mixing material sensitive to contamination. Furthermore, on occasion, oil enters the air stream, resulting in contamination of the materials being mixed, such as but not limited to paint. Oil contamination of paint causes "fish eyes" and other undesired effects resulting in rejection of the finished product.

Some piston style pneumatic motors use plastic parts impregnated with lubricating properties, overcoming the constant lubrication issue. Some piston style pneumatic motors use a plastic based connecting rod that is attached to the piston via a wrist pin. The wrist pin system is cumbersome during assembly and disassembly. It has also been found that the wrist pin system results in frequent failures of the pneumatic motor, in particular, the failure of connecting rod and piston assembly, over a period of five to six months under normal operating conditions. In studies which replicate a full load on the pneumatic motor, the wrist pin system failed in five weeks. The contact area between the piston and the connecting rod in the wrist pin system, is small which results in frequent wearing down of the connecting rod.

There is a need for a connecting rod and piston system which increases the contact area between the piston and the connecting rod. There is also a need for a connecting rod and piston system without the need of a wrist pin. There is also a need for a connecting rod and piston system for a pneumatic motor without the need for frequent lubrication.

SUMMARY

According to one aspect, there is provided a connecting rod and piston for use in a oil-less pneumatic motor, wherein said connecting rod and piston do not require a wrist pin for connecting said rod to said piston. Preferably said connecting rod and piston do not require lubrication, preferably do not require added lubrication. Preferably said connecting rod and piston having self lubricating properties.

In one embodiment, said connecting rod comprises at least two ends, said at least two ends connected to each other by a connecting member of a predetermined length. Preferably a piston end and a crankshaft end, connected to each other by a connecting member of a predetermined length, said piston end being distant said crankshaft end. Preferably said piston end is substantially spherical and/or ball shaped and said crankshaft end is shaped for engagement with a crankshaft, preferably said crankshaft end is arcuate shaped. Preferably said connecting rod is made of a material suitable for use in oil-less pneumatic motors, preferably selected from the group consisting of plastic pellets combined with oil, preferably mineral oil; oil encapsulated plastic pellets, such as but not limited to oil impregnated nylon; acetal resin (preferably acetal homopolymer resin such as DELRIN® resin); nylon plastics (preferably NYLATRON® plastic, more preferably NYLATRON® GSM (oil filled nylon)); polytetrafluoroethylene filled DELRIN® resin; TURCITE® material; oil filled cast nylon 6; MDS (molybdenum disulphide) filled nylon 6; and combinations thereof. Preferably said piston comprises a cylinder end and a connecting rod piston end receiving end, wherein said connecting rod piston end receiving end matingly engages said connecting rod piston end. Preferably said connecting rod piston end receiving end is a socket shape to matingly receive said ball shaped piston end. More preferably, said connecting rod piston end receiving end further comprises a piston seal, for sealing said connecting rod piston end in said piston. Preferably said piston seal is made of a material suitable for use in pneumatic motors known to persons skilled in the art. Preferably said material is selected from the group consisting of Buna-N (nitrile rubber); fluoroelastomer; EPDM (ethylene propylene diene monomer) rubber; perfluoroelastomer; polytetrafluoroethylene; polyurethane and combinations thereof. More preferably said piston further comprises a sleeve seal for sealing said piston in a cylinder sleeve. Said sleeve seal is made of a material suitable for use in pneumatic motors known to persons skilled in the art. Preferably said material is selected form the group consisting of urethane; UHMW (ultra-high molecular weight) polyethylene; fluoroelastomer; Buna-N; and combinations thereof. Preferably said piston is substantially cylindrical in shape, for engagement with said cylinder sleeve. Preferably said piston is made of a material suitable for use in oil-less pneumatic motors, preferably selected from the group consisting of plastic pellets combined with oil, preferably mineral oil; oil encapsulated plastic pellets, such as but not limited to oil impregnated nylon; acetal resin (preferably acetal homopolymer resin such as DELRIN® resin); nylon plastics (preferably NYLATRON® plastic, more preferably NYLATRON® GSM (oil filled nylon)); polytetrafluoroethylene filled DELRIN® resin; TURCITE® material; oil filled cast nylon 6; MDS (molybdenum disulphide) filled nylon 6; and combinations thereof. When said connecting rod is connected to said piston, said ball shaped piston end is matingly engaged with said piston while allowing for a pendulum movement of said connecting rod in said piston in at least two planes, preferably greater than two planes (as compared to existing rod and piston "wrist pin" systems allowing movement in only one plane). Preferably said pendulum movement is multiplane, facilitating assembly and disassembly of said rod and piston into said pneumatic motor. Furthermore, said ball and socket system increases the contact area of the bearing surface by at least twice, as compared to existing "wrist pin" systems, more preferably by at least three times, reducing internal wear of the connecting rod with said piston.

According to yet another embodiment, said piston seal comprises a connecting rod retainer, preferably a removable connecting rod retainer, preferably further comprising a retainer lock, preferably a removable retainer lock, to lock said connecting rod retainer with said piston. Said connecting rod retainer once inserted in said piston, forming a sphere around said ball shaped piston end. Said connecting rod retainer further comprises a connecting rod movement guide for pendulum movement of said connecting rod in relation to said connecting rod piston. In a preferred embodiment, said connecting rod movement guide further provides for lateral movement of said connecting rod in relation to said connecting rod piston for facilitating installation and removal of said connecting rod and piston in an air motor. Preferably, said pendulum movement is from 0 to about 25 degrees to at least two sides from centre. Preferably, said lateral movement is from 0 to about 10 degrees to at least one side from centre and substantially normal to said pendulum movement. More preferably, said lateral movement is from 0 to about 10 degrees to one side only from centre and substantially normal to said pendulum movement.

In one embodiment, said connecting rod retainer is made of the same material as said piston as described herein. Preferably, said retainer lock is made of a suitable material for locking said connecting rod retainer in said piston. In one embodiment, said retainer lock is made of steel, preferably spring steel or stainless steel, or the like. More preferably, cadmium coated spring steel. Even more preferably a rust corrosion resistant spring material.

In a preferred embodiment, said piston further comprises a retainer lock receiver for matingly receiving said retainer lock.

In a preferred embodiment, said retainer lock is receivable by a retainer lock receiver on said piston for removably locking said retainer with said piston.

According to yet another aspect, there is provided an oil-less pneumatic motor comprising a connecting rod and piston, with a greater contact area between the connecting rod and the piston, compared to a connecting rod connecting to said piston via a wrist pin, resulting in mitigation of wear of said connecting rod.

According to yet another aspect, there is provided an oil-less pneumatic motor comprising: a body having a first end and second end, a motor head having a first end and a second end, a crankshaft having a top and a bottom, and at least 3 oil-less piston and connecting rod assemblies as described herein (without wrist pins); said first end of said body connected to said second end of said motor head. Said crankshaft disposed within said body and said motorhead. Said motorhead having at least 3 piston and connecting rod assembly receiving apertures extending normal and axially away from said first and second ends.

According to yet another aspect, there is provided use of a connecting rod and piston in an oil-less pneumatic motor, wherein said connecting rod and piston do not require a wrist pin for connecting said rod to said piston.

The term oil-less used herein means not requiring external and frequent lubrication.

BRIEF DESCRIPTION OF THE FIGURES

FIGS. 17A-17D show the connecting rod and piston of FIG. 10 at various stages of assembly.

DETAILED DESCRIPTION

Figure 1A:
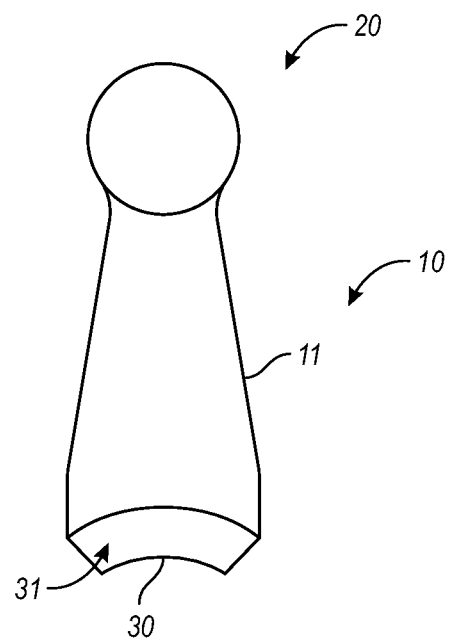
FIGS. 1A and 1B are a side cutaway view of the connecting rod and piston assembly, according to one embodiment.
Figure 1B:
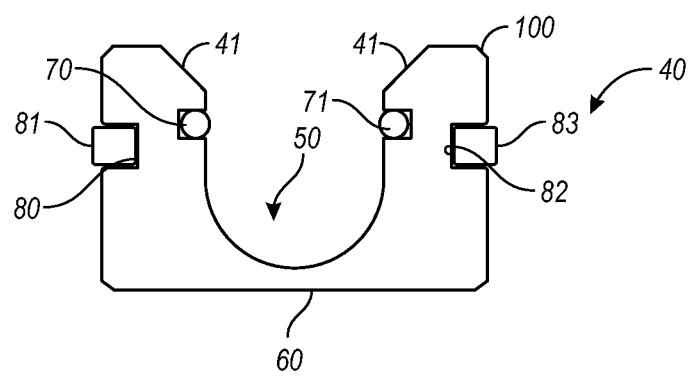
Figure 2:
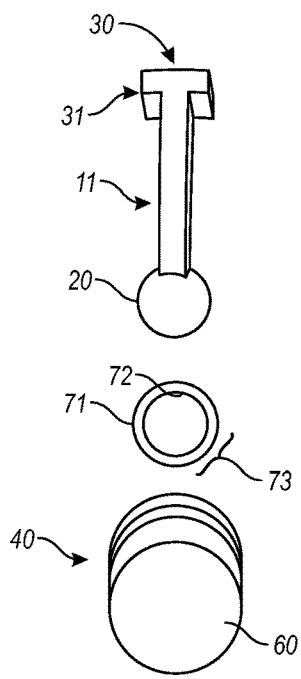
FIGS. 2-4 provide a disassembled view of the connecting rod and piston, according to one embodiment.
Figure 3:
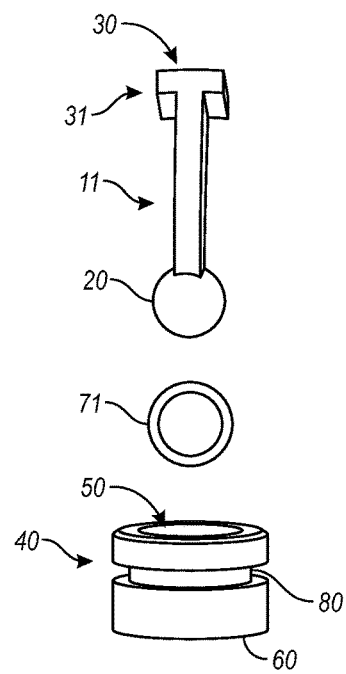
Figure 4:
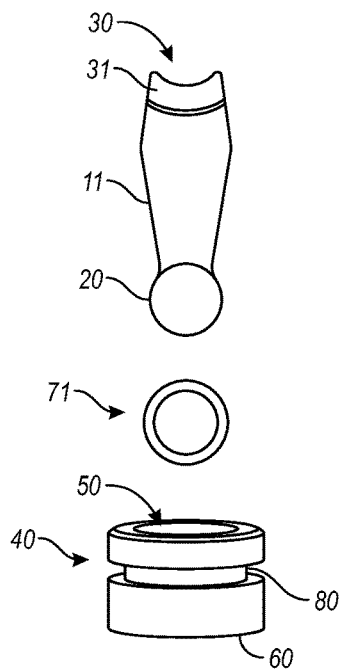
Figure 5:
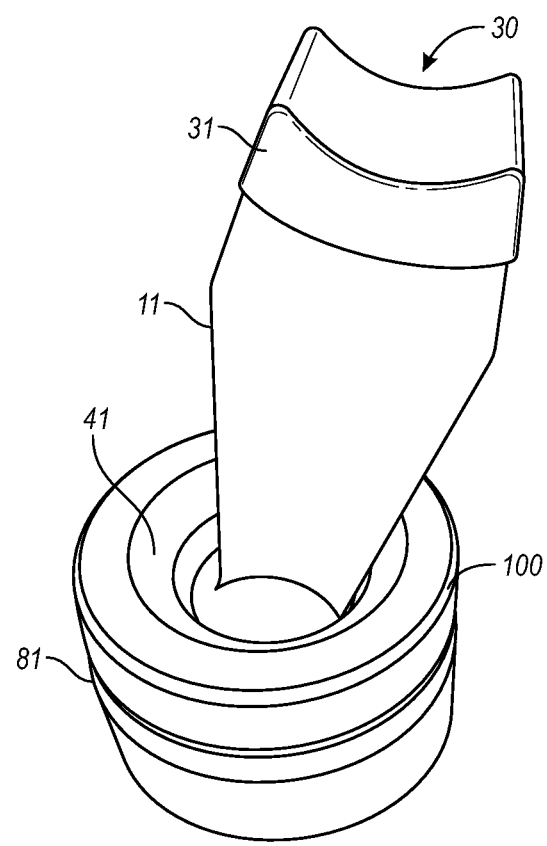
FIGS. 5-6 is an assembled view of the connecting rod and piston in various positions.
Figure 6:
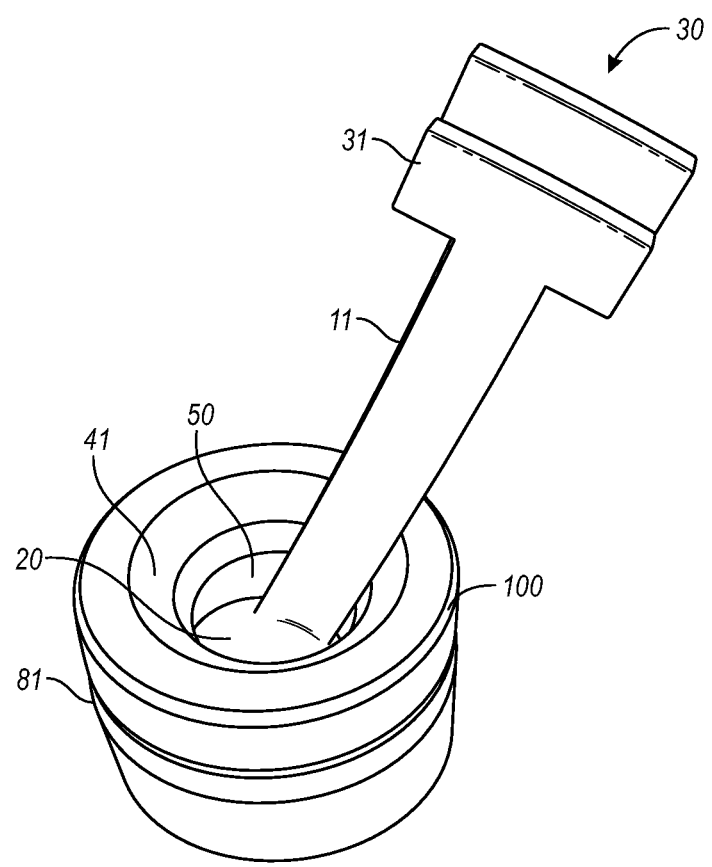

Referring now to FIGS. 1A and 1B, there is provided a connecting rod 10 with a piston end 20 and a crankshaft end 30. The crankshaft end 30 and piston end 20 are connected via a connecting rod member 11. The crankshaft end is arcuate in shape to engage with the crankshaft (not shown). The crankshaft end 30 is formed of a raised arcuate edge 31, of a predetermined thickness and diameter. The thickness of the raised arcuate edge 31 is greater than the thickness of the connecting rod member 11. The thicker raised arcuate edge 31 allows for the use of a combination retaining ring/thrust washer to reduce, preferably prevent, the crankshaft end 30 of the connecting rod 10 from becoming separated from the needle bearing (not shown) in the motor. This method further maintains the connecting rod 10 thrust remains centred on the needle bearing (not shown) for even wear. The connecting rod member 11 tapers inward from the crankshaft end 30 to the piston end 20, depicted here as a sphere or ball. The taper in this embodiment is a gradual taper (10 degrees), however any suitable degree of tapering which accommodates and does not restrict the movement of said connecting rod within said piston may be used. The piston end ball 20 is smaller in diameter than the arcuate crankshaft end 30. There is also provided a piston 40. The piston 40 has a piston end receiving socket 50 and a piston head 60. The piston 40 has a piston end seal receiver 70 for receiving a piston end seal 71. The piston end seal receiver 70 and piston end seal 71 are annular in shape. With reference to FIG. 2, the piston end seal 71 has an inner radius 72 and an outer radius 73. The outer radius 73 sits along the piston end seal receiver 70 in a friction fit. The inner radius 72 is smaller than the outer radius 73 and smaller than the radius of the socket 50, thereby retaining the piston end 20 in the socket 50 and providing the piston end 20 the ability to move in a pendulum motion in at least two planes. The seal 71 acts as a retainer to keep the piston end 20 in the socket 50. The piston 40 has an inner chamfer 41, in this embodiment a 45 degree chamfer, along the outside edge of the socket 50, to guide the piston end 20 into the socket 50, when inserting said piston end 20 into said socket 50, as well as to allow for greater pendulum movement of said connecting rod when in said socket.

The taper discussed above, provides for sufficient clearance between the connecting rod 10 and the inner chamfer of the piston, while the motor is running, avoiding binding, since the angle formed by the connecting rod 10 with the piston, may vary up to 30 degrees, to the left and right of centre, during each revolution of the motor.

The piston 40 further comprises an outer seal (sleeve seal) receiver 80 for receiving a sleeve seal 81. The outer seal receiver 80 and sleeve seal are annular in shape. The sleeve seal has an inner radius 82 and an outer radius 83. The inner radius 82 sits along the outer seal receiver 80 in a friction fit. The outer radius 83 allows the piston 40 to move within the piston sleeve 90 while maintaining a seal between the piston 40 and the sleeve 90. Proximate the piston end receiving socket 50, the piston has an outer chamfered edge 100. In this embodiment, the piston end seal 71 and sleeve seal 81 are offset one another. The piston end seal 71 maintains the ball of the piston end 20 snug in the socket 50. The sleeve seal 81 is proximate the outer chamfered edge 100, without compromising strength, such that, in operation, the air acting on the piston 40 may surround the outside of the piston 40 while also acting as an air bearing, further reducing friction between moving parts, however, they may be aligned as well, without compromising the operation of the system.

When the connecting rod and piston are connected, the connecting rod is not restricted in the plane of movement, due to the ball and socket configuration, and the inner chamfer 41. This also facilitates the assembly and disassembly of the pneumatic motor, and in particular when replacing a connecting rod and piston in a pneumatic motor.

Furthermore, the connecting rod and piston, having self-lubricating properties, allow for use of same in an oil-less pneumatic motor, reducing oil contamination in areas and conditions sensitive to oil contamination.

In another embodiment, referring now to FIGS. 10-17D, there is provided a connecting rod retainer 300 and a retainer lock 310, for retaining the connecting rod 10, and more particularly, the piston end ball 20 of the connecting rod 10, in the piston end receiving socket 50.

Referring specifically to FIGS. 10-14, the inner chamfer 41 is not seen in this embodiment. Rather, a connecting rod retainer 300 configured to matingly fit in the piston to secure the piston end ball 20 in the piston end receiving socket 50 forming a sphere around said piston end ball 20 and to guide the connecting rod 10 in a pendulum motion (FIG. 11) when is use in the air motor, as well as a lateral motion (FIGS. 15 and 16) facilitating air motor installation/removal.

Figure 16:
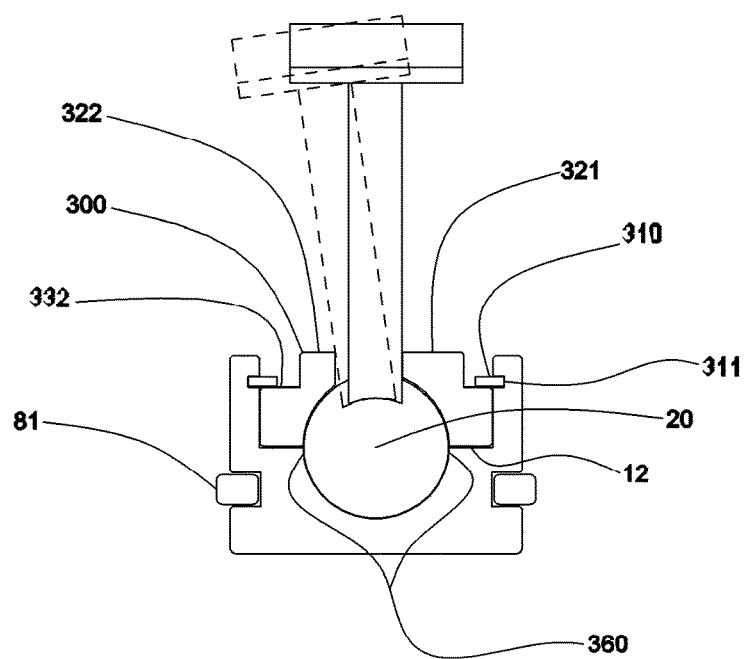

In this embodiment, the connecting rod retainer 300 is cylindrical in shape to allow for a friction fit in the piston. The retainer 300 has a top 320, a bottom 330. The bottom 330 is substantially ring shaped of a predetermined thickness and first diameter and the top 320 is substantially ring shaped of a predetermined thickness and a second diameter. The second diameter being smaller than the first diameter. The bottom 330 comprises a half sphere concave shape 340 to accommodate a portion of the piston end ball. The top 320 includes an elongated guide 350 to allow for pendulum motion of the rod when in the piston when in use in an air motor, and to allow for lateral movement of the rod facilitating installation and removal of the rod and piston when required. In this embodiment, the degree of pendulum motion is from about 0 to about 25 degrees rotation from centre, and the degree of lateral movement is from about 0 to about 10 degrees from centre. Preferably, as best seen in FIG. 16, the lateral movement is to only one side of the guide 350. This is accomplished by the elongated guide 350 having a width such that when the connecting rod 10 is normal to the piston, one side of the connecting rod is flat against a first side wall 321 and distant a second side wall 322. This allows the connecting rod 10 to move laterally by rotating on the end ball 20. Although lateral movement is shown to one side only, in this embodiment, the width of the guide 350 may be such that lateral movement may be to both sides of the guide 350. The larger diameter of the bottom 330 together with smaller diameter of the top 320 form a ledge 332 to support the retainer lock 310 (in this embodiment a resilient metal clip) when squeezed allows for insertion of the lock 310 into the piston and when allowed to return to its resting position, engages the retainer lock receiver 311, in this embodiment formed as an annular groove along the inside wall of the piston. Furthermore, the retaining lock 310 is "C" shaped with an eyelet 312 at each end 313 of the "C" to allow for a tool to engage and squeeze the ends 313 of the retaining lock 310. Along one side of top 300, second side wall 322 is cut such that the eyelets 312 are positioned against the outside of second side wall 322 to keep the retaining lock 310 in position and prevent the retaining lock from moving, and in particular, rotating on the ledge 332.

Figure 10:
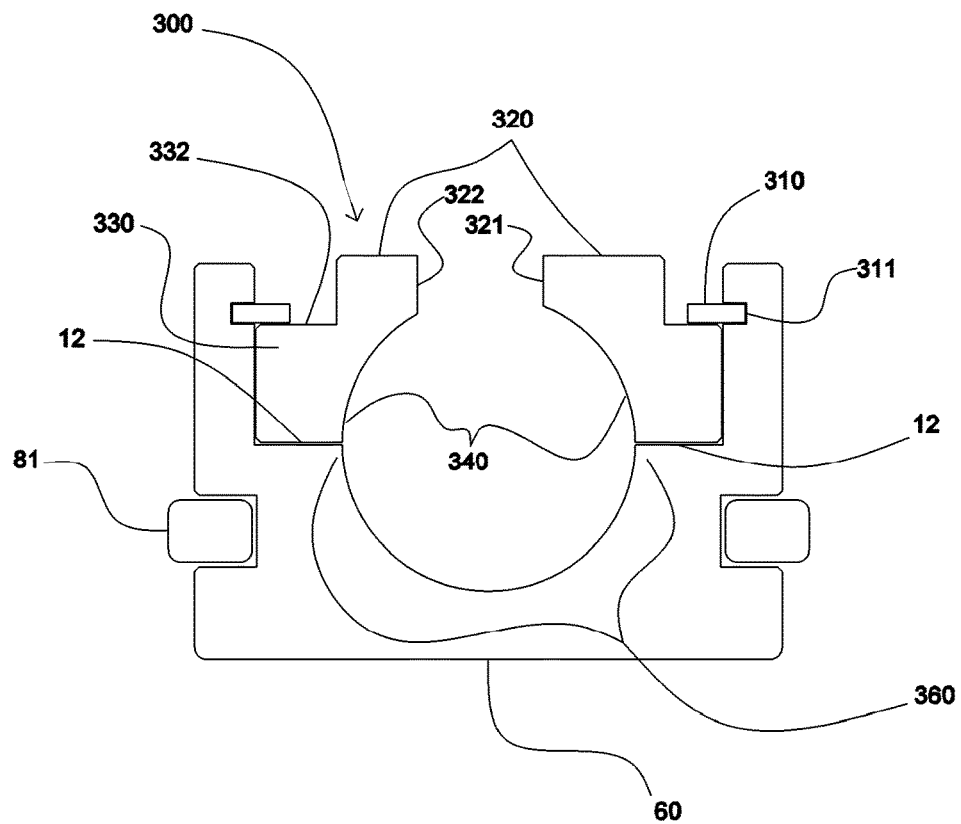
FIG. 10 is a side cutaway view of the connecting rod and piston assembly, according to another embodiment.
Figure 11:
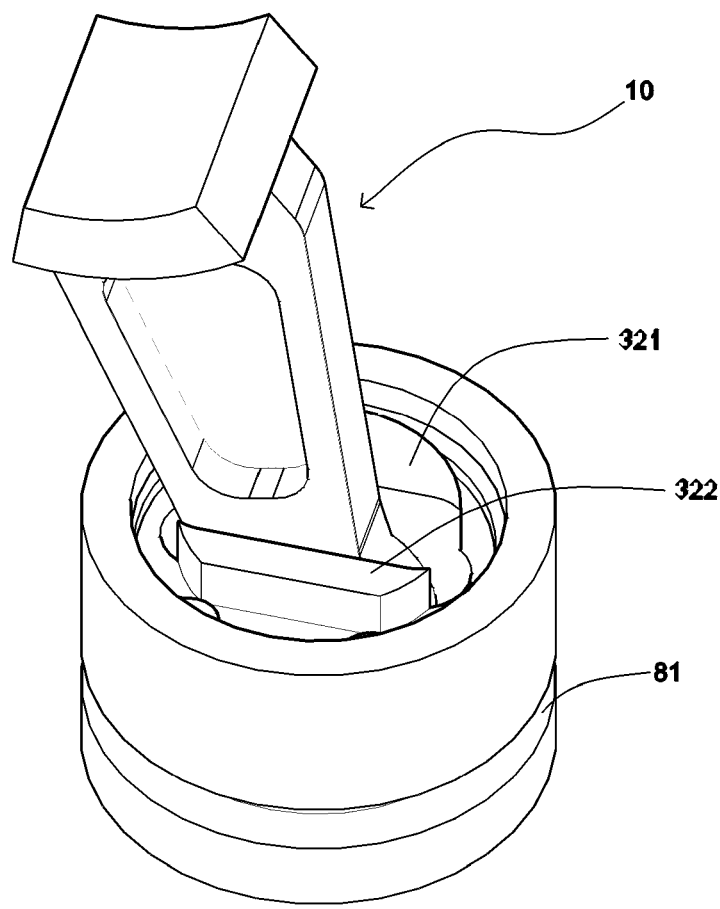
FIG. 11 is a perspective view of the assembled connecting rod and piston of FIG. 10.
Figure 12:
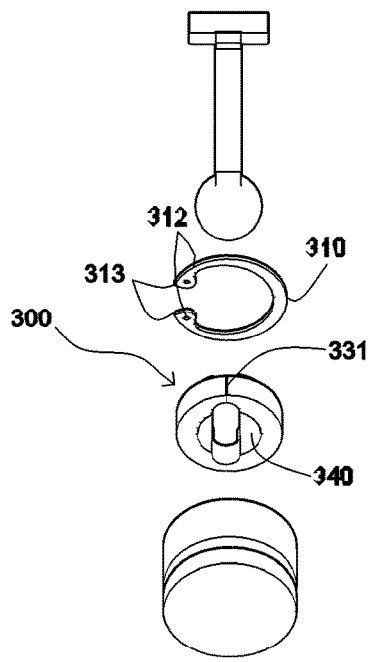
FIGS. 12-14 provide a disassembled view of the connecting rod and piston of FIG. 10.
Figure 13:
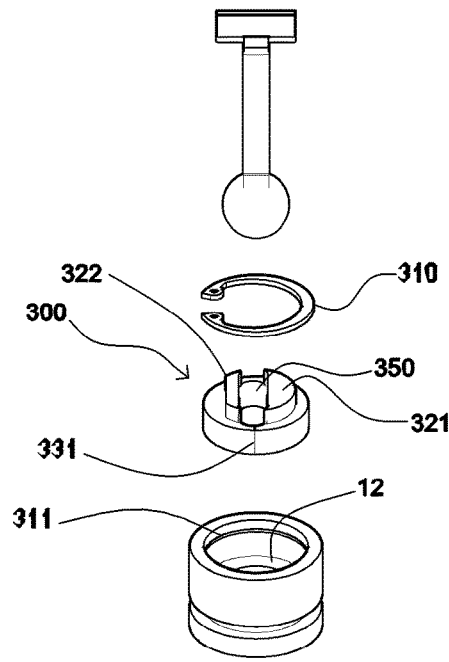
Figure 14:
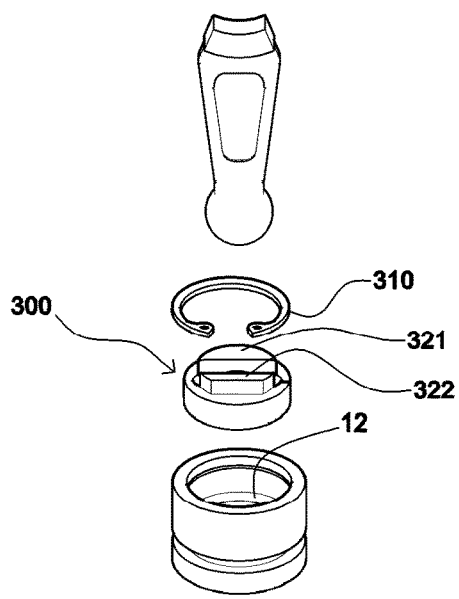
Figure 15:
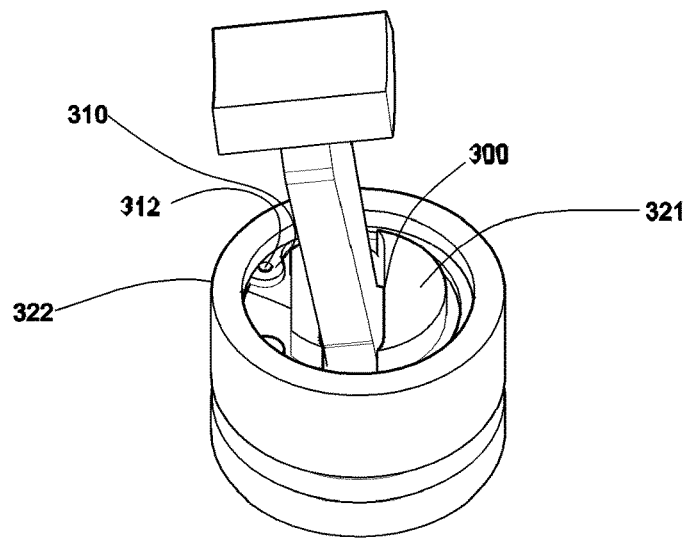
FIGS. 15 and 16 show the connecting rod and piston of FIG. 10 with the lateral movement of the connecting rod moved to one side of the connecting rod guide.

As best seen in FIGS. 17A-17D, the retainer 300 is resilient, and in particular, the bottom 330 has a slit 331 along the side thereof to allow for engagement with the connecting rod member 11. When needed, the retainer 300 is open at the slit 331 (FIG. 17B) and fit around the connecting rod member 11, and the retainer 300 is allowed to return to its normal shape, such that the bottom half sphere concave shape 340 is in contact with a portion of the end ball. The retainer 300 and connecting rod 10 are then inserted in the piston (FIG. 17C) followed by the retainer lock (FIG. 17D). As best seen in FIG. 10, the piston, in this embodiment, has an internal ledge 12 to allow for the retainer 300 to sit thereon. In this embodiment, the internal ledge 12 is of the same width as the lower portion of the retainer 300. The inside of the piston, in this embodiment, has a half sphere concave shape 360 complimenting the half sphere concave shape 340, such that when the retainer 300 is resting on the ledge 12, a sphere void is formed to accommodate the piston end ball 20, and allowing for sufficient movement of the end ball 20 in said sphere for operation in an air motor.

Surprisingly, applicant has found the above embodiments provide for at least the following: increase the surface area contact between the rod ball and the retainer on the return stroke of the air motor;

reduce unwanted movement between the rod ball and the inside bottom of the piston; and increase the working life of the rod and piston by reducing the wear on the inside bottom of the piston during use.

Figure 7:
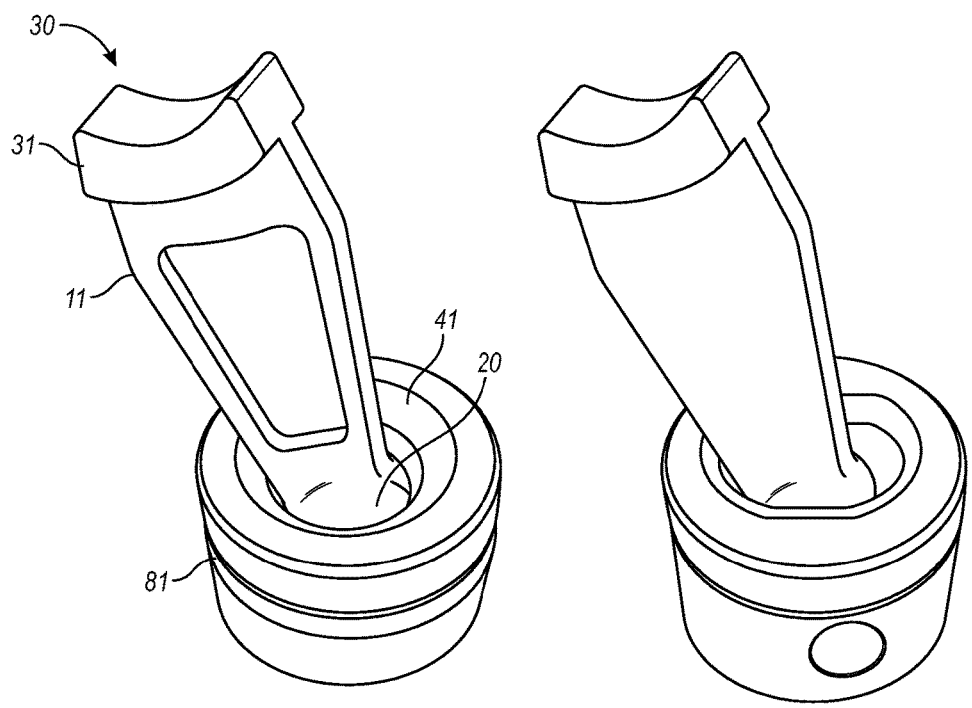
FIGS. 7-8 are a view of a known system and the present connecting rod and piston assembly.
Figure 8:
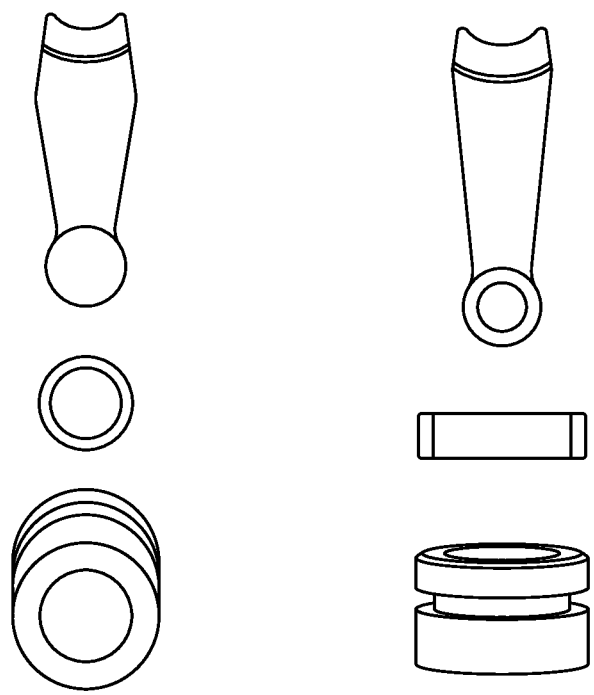

In contrast, the known connecting rod and piston shown in FIGS. 7 and 8, depicts a connecting rod and piston assembly wherein the connecting rod is connected to the piston with a wrist pin. This restricts the connecting rod to a pendulum motion in a single plane. The small surface area of the piston end of the connecting rod wears down quickly due to the small surface contact area with the piston. The connecting rod is further restricted to a single plane pendulum motion due to the piston bore shape. This is a significant drawback when assembling the pneumatic motor and inserting the connecting rod and piston in place. The restricted movement of the connecting rod causes assembly to be cumbersome due to constrained spaces.

Another drawback with the known system is the wrist pin, is typically made of several components, adding to the number of components in the system that may fail.

The current system eliminates the need for a wrist pin, and thus the step of aligning the wrist pin when assembling the unit, as well as replacement of the wrist pin.

Example 1A

The following example compares the life span of the known system with the present system.

The known system was assembled into a pneumatic motor and the present "wrist pin" free system was assembled into a pneumatic motor. Both motors were run under the same conditions (simulating a full load by placing flow control on the exhaust port of a pneumatic motor). The known system failed within five weeks at full load simulation. The present system depicted no evidence of wear after three months at full load simulation.

Example 1B

The following example shows the performance of the embodiment as per FIGS. 10-17D.

The rod and piston of this embodiment was placed in a pneumatic motor. The motor was run with 90 psi input with a flow control on the exhaust to create 80 psi pressure on the piston which created a load of approximately 100 pounds on each piston. The motor was run continuously under these conditions for six weeks at 600 rpm after which there were no signs of unexpected wear.

The connecting rod and piston may be manufactured from steel, aluminum or plastics (as described above). Preferably machined. In some embodiments, the plastic components may be moulded.

The preferred use of said connecting rod and piston in an pneumatic motor is for driving paint mixing paddles in paint mix rooms for automated painting systems. The pneumatic motor described herein may be manufactured and assembled in any combination of three or more piston configurations.

Example 2

Figure 9:
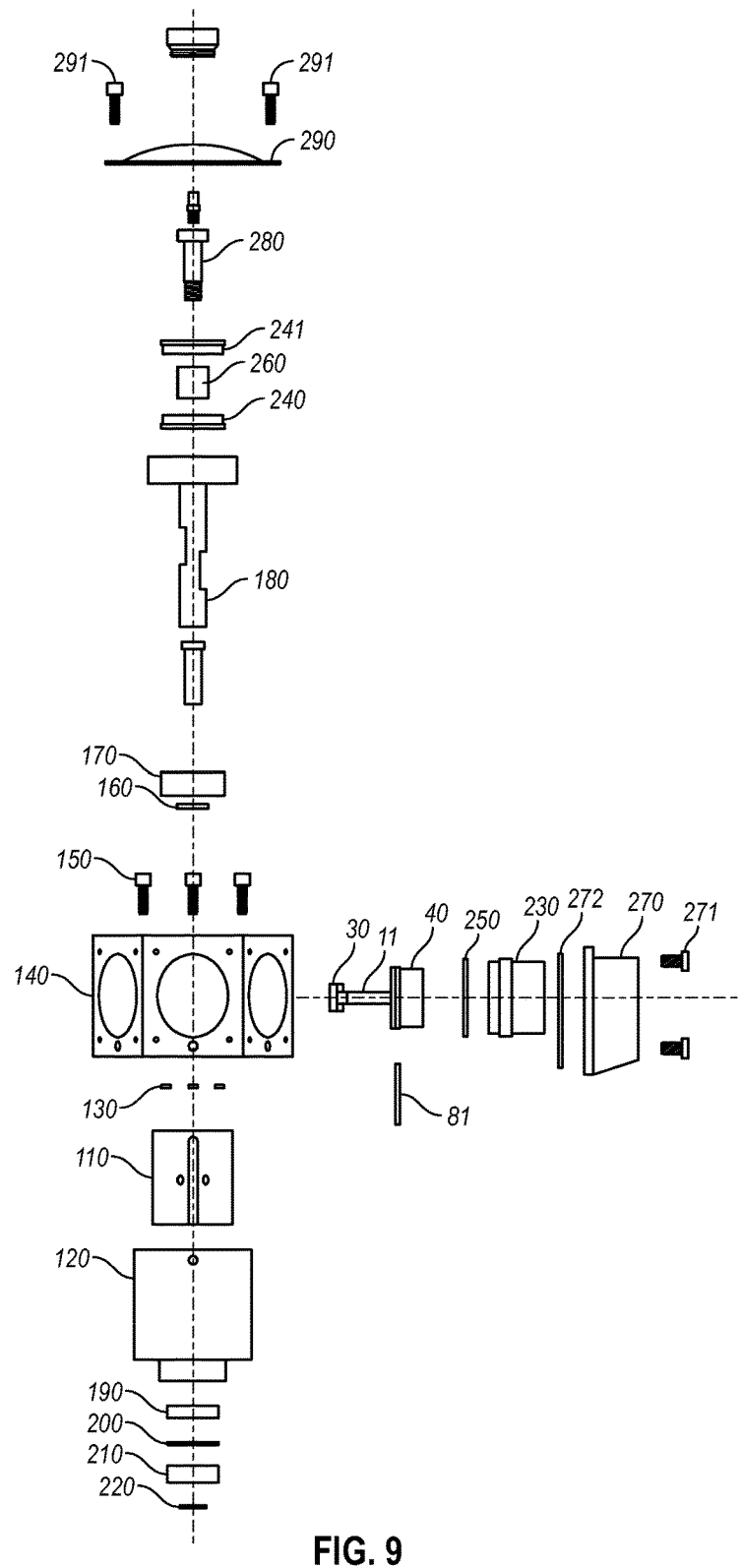
FIG. 9 is an exploded view of a pneumatic motor incorporating the connecting rod and piston assembly described herein.

The following example provides a typical set of instructions for assembly of a pneumatic motor incorporating the connecting rod and piston described herein. Reference is made to FIG. 9.

1. If valve bushing 110 has been removed, line up the guide in the body 120 with the groove in the valve bushing 110 and press into the housing until flush with the body.
2. Install 3 O-rings 130 or more (depending on the number of cylinders, i.e. 3 cylinders, 3 O-rings) in the underside of the motor head 140.
3. Install the motor head 140 by inserting three cap screws 150 loosely. Do not tighten until step 9.
4. Install an O-ring 160 in the valve bushing 110.
5. Lubricate the inside of the valve bushing 110 and the O-ring 160 with recommended grease.
6. Install bearing 170 on crankshaft 180.
7. Install crank seal 190 in the drive end of the body 120 with the seal lip towards the valve bushing 110 and secure same with a snap ring 200.
8. Carefully, so as not to damage the O-ring 160, press the crankshaft 180 into place.
9. Press into place bearing 210, while supporting the top end of the crankshaft 180 to prevent the bearing 210 from moving. Install the snap ring 220 and tighten cap screws 150.
10. Insert the piston end seal 71 into the piston end seal receiver 70 of the piston head 40. Lubricate with ample recommended grease.
11. Insert the ball end 20 of the connecting rod 10 into the piston 40 using any suitable method, until the connecting rod 10 is fully engaged in the piston receiver 50 of the piston 40.
12. Install the piston seal 81 onto the piston seal receiver 80 with the seal lip facing the top of the piston 40. Lubricate with ample recommended grease.
13. Insert rod assemblies 10 into the cylinder sleeves 230 by sliding the connecting rod end through the cylinder sleeve first.
14. Install the lower thrust washer 240 onto the top end of the crankshaft 180 with the flat side down.
15. Install the sleeve seal 250 onto the cylinder sleeve 230 and install rod assembly and cylinder sleeve through the opening in the motorhead 140. Hook the crankshaft end 30 of the rod assembly into the bottom of the thrust washer 240. Repeat for remaining rod assemblies.
16. When all rod assemblies and cylinder sleeves are in position, lubricate the crankshaft ends of the rod assemblies with grease and slide needle bearing 260 down through the centre of the rod assemblies.
17. Attach all cylinder caps 270 over the cylinder sleeves 270 using screws 271 and cap seals 272. Tighten screws, preferably to 40 in/lbs torque.
18. Install the top thrust washer 241 with the flat side up and slide crank pin 280 down through the centre of the assembly. Tighten crank pin 280 to 18 ft/lbs of torque.
19. Using recommended grease and grease fitting, pump the crank pin full of grease until grase comes out the sides of the thrust washers.
20. Using a wrench on the drive end of the crankshaft, rotate the crankshaft to ensure motor turns freely.
21. If necessary, tap the drive end of the crankshaft lightly with a soft hammer to centre the bearings.
22. Attach the head cover 290 with the screws 291. Tighten to 40 in/lbs torque.
23. Connect motor to appropriate air supply, set speed and test for smoothness and leaks.

When incorporating the rod and piston as depicted in FIGS. 10-17D, the following steps above are changed as follows:

11. Place connecting rod retainer (300) via split (320), over mid-point of connecting rod (10) with outside of second side wall (322) facing hollow side of connecting rod (10), and the raised boss facing the crank end (30). Lubricate ball end (20) of connecting rod (10) with ample grease and insert ball end (20) into matching concave shape in piston (12). Put retainer lock (310) over connecting rod (10) and align eyelets (312) with flat outside of second side wall (322) on rod retainer (320). Insert retainer lock (310) into retainer lock groove (311) in piston (12) and release. Make sure retainer lock (310) is securely seated into retainer lock groove (311) in piston (12).
15. Install the sleeve seal 250 onto the cylinder sleeve 230 and install rod assembly and cylinder sleeve through the opening in the motorhead 140. Hook the crankshaft end 30 of the rod assembly into the bottom of the thrust washer 240, 240, with recessed (hollow) side of connecting rod (10) facing up towards top of motor, (to utilise space in connecting rod retainer (320) to make assembly easier). Repeat for remaining rod assemblies.

As many changes can be made to the preferred embodiment of the invention without departing from the scope thereof; it is intended that all matter contained herein be considered illustrative of the invention and not in a limiting sense.

The invention claimed is:

1. An oil-less pneumatic motor comprising a connecting rod and piston assembly; said connecting rod comprising at least two ends, connected to each other by a connecting member of a predetermined length; said at least two ends comprising a piston end and a crankshaft end; said piston end being distant said crankshaft end; said piston comprising a cylinder end and a connecting rod piston end receiving end, wherein said connecting rod piston end receiving end matingly engages said connecting rod piston end; said piston end being substantially ball shaped and said crankshaft end shaped for engagement with a crankshaft wherein said crankshaft end is arcuate shape with a raised arcuate edge of a radial thickness greater than a greatest thickness of said connecting member in a direction of the rotational axis of the crankshaft for use with a combination retaining ring/thrust washer and said connecting rod piston end receiving end further comprises a piston seal, for sealing said connecting rod piston end in said piston; said connecting rod piston end receiving end being substantially socket shaped for matingly receiving said ball shaped piston end; said connecting rod and piston assembly in an oil-less pneumatic motor driving paint mixing paddles.

2. The oil-less pneumatic motor of claim 1 wherein the connecting rod and piston assembly is made of a material selected from the group consisting of plastic pellets combined with oil; oil encapsulated plastic pellets; acetal resin; nylon plastic; polytetrafluoroethylene filled acetal homopolymer resin; internally lubricated acetal-based material; oil filled cast nylon 6; MDS (molybdenum disulphide) filled nylon 6; and combinations thereof.

3. The oil-less pneumatic motor of claim 1 wherein said piston seal is made of a material is selected from the group consisting of Buna-N (nitrile rubber); fluoroelastomer; EPDM (ethylene propylene diene monomer) rubber; perfluoroelastomer; polytetrafluoroethylene; polyurethane and combinations thereof.

4. The oil-less pneumatic motor of claim 1 wherein said piston further comprises a sleeve seal for sealing said piston in a cylinder sleeve.

5. The oil-less pneumatic motor of claim 4 wherein said sleeve seal is made of a material selected form the group consisting of urethane; UHMW (ultra-high molecular weight) polyethylene; fluoroelastomer; Buna-N; and combinations thereof.

6. The oil-less pneumatic motor of claim 5 wherein said piston is substantially cylindrical in shape, for engagement with said cylinder sleeve and made of a material selected from the group consisting of plastic pellets combined with oil; oil encapsulated plastic pellets; acetal resin; nylon plastics; polytetrafluoroethylene filled acetal homopolymer resin; internally lubricated acetal-based material; oil filled cast nylon 6; MDS (molybdenum disulphide) filled nylon 6; and combinations thereof.

7. The oil-less pneumatic motor of claim 6 wherein when said connecting rod is connected to said piston, said piston end is matingly engaged with said piston allowing for a pendulum movement of said connecting rod in said piston in at least two planes.

8. The oil-less pneumatic motor of claim 7 wherein said pendulum movement is greater than two planes.

9. The oil-less pneumatic motor of claim 6 wherein said oil for said plastic pellets combined with oil is mineral oil; said oil encapsulated plastic pellets is oil impregnated nylon; said acetal resin is acetal homopolymer resin; and said nylon plastics is oil filled nylon plastic.

10. The oil-less pneumatic motor of claim 1 with the proviso of no wrist pin in said connecting rod and piston assembly.

11. The oil-less pneumatic motor of claim 1 or 2 wherein said crankshaft end is arcuate shape and said connecting rod piston end receiving end further comprises a retainer, for retaining said connecting rod piston end in said piston.

12. The oil-less pneumatic motor of claim 11 wherein said connecting rod and piston assembly further comprises a retainer lock for locking said retainer in place with said piston.

13. The oil-less pneumatic motor of claim 12 wherein said retainer further comprises a guide allowing for a pendulum movement of said connecting rod in said piston in at least two planes.

14. The oil-less pneumatic motor of claim 13 wherein said retainer further comprises a slot for engaging with said connecting rod.

15. An oil-less pneumatic motor comprising a connecting rod and piston assembly; said connecting rod comprising at least two ends, connected to each other by a connecting member of a predetermined length; said at least two ends comprising a piston end and a crankshaft end; said piston end being distant said crankshaft end; said piston comprising a cylinder end and a connecting rod piston end receiving end, wherein said connecting rod piston end receiving end matingly engages said connecting rod piston end; said piston end being substantially ball shaped and said crankshaft end shaped for engagement with a crankshaft; said connecting rod piston end receiving end being substantially socket shaped for matingly receiving said ball shaped piston end; wherein said crankshaft end is arcuate shaped with a raised arcuate edge of a radial thickness greater than a greatest thickness of said connecting member in a direction of the rotational axis of the crankshaft; said oil-less pneumatic motor driving paint mixing paddles.

16. A paint mixing assembly comprising an oil-less pneumatic motor comprising a connecting rod and piston assembly; said connecting rod comprising at least two ends, connected to each other by a connecting member of a predetermined length; said at least two ends comprising a piston end and a crankshaft end; said piston end being distant said crankshaft end; said piston comprising a cylinder end and a connecting rod piston end receiving end, wherein said connecting rod piston end receiving end matingly engages said connecting rod piston end; said piston end being substantially ball shaped and said crankshaft end shaped for engagement with a crankshaft for mixing paint; said connecting rod piston end receiving end being substantially socket shaped for matingly receiving said ball shaped piston end; wherein said crankshaft end is arcuate shape with a raised arcuate edge of a radial thickness greater than a greatest thickness of said connecting member in a direction of the rotational axis of the crankshaft.

17. A paint mixing assembly comprising an oil-less pneumatic motor comprising a connecting rod and piston assembly; said connecting rod comprising at least two ends, connected to each other by a connecting member of a predetermined length; said at least two ends comprising a piston end and a crankshaft end; said piston end being distant said crankshaft end; said piston comprising a cylinder end and a connecting rod piston end receiving end, wherein said connecting rod piston end receiving end matingly engages said connecting rod piston end; said piston end being substantially ball shaped and said crankshaft end shaped for engagement with a crankshaft for mixing paint wherein said crankshaft end is arcuate shape with a raised arcuate edge of a radial thickness greater than a greatest thickness of said connecting member in a direction of the rotational axis of the crankshaft for use with a combination retaining ring/thrust washer and said connecting rod piston end receiving end further comprises a piston seal, for sealing said connecting rod piston end in said piston; said connecting rod piston end receiving end being substantially socket shaped for matingly receiving said ball shaped piston end.

\* \* \* \* \*